(12) United States Patent
Howarter et al.

(10) Patent No.: US 9,955,212 B2
(45) Date of Patent: *Apr. 24, 2018

(54) MEDIA CONTENT SHIFTING

(71) Applicant: CenturyLink Intellectual Property LLC, Denver, CO (US)

(72) Inventors: Jamie Howarter, Overland Park, KS (US); Doug Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/690,933

(22) Filed: Apr. 20, 2015

(65) Prior Publication Data

US 2015/0229992 A1    Aug. 13, 2015

Related U.S. Application Data

(63) Continuation of application No. 13/940,999, filed on Jul. 12, 2013, now Pat. No. 9,038,114, which is a
(Continued)

(51) Int. Cl.
*H04N 21/433* (2011.01)
*H04N 21/472* (2011.01)
(Continued)

(52) U.S. Cl.
CPC ........... *H04N 21/4334* (2013.01); *H04N 5/76* (2013.01); *H04N 9/80* (2013.01); *H04N 21/4147* (2013.01);
(Continued)

(58) Field of Classification Search
CPC ........... H04N 21/4147; H04N 21/4334; H04N 21/43615; H04N 21/4583; H04N 21/47214; H04N 21/4755
(Continued)

(56) References Cited

U.S. PATENT DOCUMENTS 6,173,112 B1   1/2001  Gruse et al.
6,636,953 B2   10/2003 Yuasa et al.
(Continued)

OTHER PUBLICATIONS

U.S. Appl. No. 12/404,678; Advisory Action dated Jan. 13, 2012; 4 pages.
(Continued)

*Primary Examiner* — Jeremy S Duffield
(74) *Attorney, Agent, or Firm* — Swanson & Bratschun, L.L.C.

(57) ABSTRACT

Embodiments of the disclosed invention include a system and method for recording television content. For example, in one embodiment, a method performed by a digital video recorder is disclosed that includes communicating with a home gateway to determine whether a device connected to the home gateway has enough free storage space to store a television program in the event that the digital video recorder determines that an internal data storage unit associated with the digital video recorder has enough free storage space to store the television program. In one embodiment, the method routes the storage of a recording of the television program to the device via the home gateway in response to a determination that the device connected to the home gateway has enough free storage space on the data storage unit associated with the device to store the television content.

17 Claims, 5 Drawing Sheets

Related U.S. Application Data continuation of application No. 12/404,678, filed on Mar. 16, 2009, now Pat. No. 8,495,687.

(51) Int. Cl.

| | |
|---|---|
| *H04N 21/475* | (2011.01) |
| *H04N 5/76* | (2006.01) |
| *H04N 21/4147* | (2011.01) |
| *H04N 21/436* | (2011.01) |
| *H04N 21/458* | (2011.01) |
| *H04N 9/80* | (2006.01) |
| *H04N 21/4627* | (2011.01) |
| *H04N 21/643* | (2011.01) |
| *H04N 21/835* | (2011.01) |

(52) U.S. Cl.
CPC ... *H04N 21/43615* (2013.01); *H04N 21/4583* (2013.01); *H04N 21/4627* (2013.01); *H04N 21/4755* (2013.01); *H04N 21/47214* (2013.01); *H04N 21/64322* (2013.01); *H04N 21/835* (2013.01)

(58) Field of Classification Search
USPC .............................................. 725/58, 78–82
See application file for complete search history.

(56) References Cited

U.S. PATENT DOCUMENTS

| | | | |
|---|---|---|---|
| 7,149,415 B2 | 12/2006 | Thiagarajan et al. | |
| 7,519,680 B1 | 4/2009 | O'Neil | |
| 7,805,055 B2 | 9/2010 | Kimoto et al. | |
| 7,840,977 B2* | 11/2010 | Walker et al. | 725/38 |
| 7,853,120 B2 | 12/2010 | Bumgardner et al. | |
| 7,895,625 B1 | 2/2011 | Bryan et al. | |
| 8,006,275 B1 | 8/2011 | Poole et al. | |
| 8,351,759 B2 | 1/2013 | Howarter et al. | |
| 8,428,436 B2 | 4/2013 | Howarter et al. | |
| 8,495,687 B2 | 7/2013 | Howarter et al. | |
| 9,038,114 B2 | 5/2015 | Howarter et al. | |
| 2002/0007426 A1 | 1/2002 | Ando et al. | |
| 2003/0236906 A1* | 12/2003 | Klemets | H04N 21/6373 709/231 |
| 2004/0101280 A1 | 5/2004 | Tobiishi | |
| 2005/0138672 A1 | 6/2005 | Stone | |
| 2005/0232210 A1* | 10/2005 | Karaoguz et al. | 370/338 |
| 2006/0095401 A1* | 5/2006 | Krikorian | H04N 21/4398 |
| 2007/0079380 A1 | 4/2007 | Kawaguchi et al. | |
| 2007/0188902 A1* | 8/2007 | Patron et al. | 360/31 |
| 2007/0245024 A1* | 10/2007 | Prus et al. | 709/226 |
| 2007/0286582 A1 | 12/2007 | Dolph | |
| 2008/0205857 A1 | 8/2008 | Kikkawa et al. | |
| 2008/0307485 A1 | 12/2008 | Clement et al. | |
| 2009/0044233 A1 | 2/2009 | Brandt et al. | |
| 2009/0044241 A1* | 2/2009 | Joo et al. | 725/114 |
| 2009/0106406 A1 | 4/2009 | Bernard et al. | |
| 2009/0245751 A1 | 10/2009 | Sato | |
| 2009/0317065 A1 | 12/2009 | Fyock et al. | |
| 2010/0001586 A1 | 1/2010 | Bernard et al. | |
| 2010/0235868 A1 | 9/2010 | Howarter et al. | |
| 2010/0247068 A1 | 9/2010 | Howarter et al. | |
| 2011/0103774 A1 | 5/2011 | Howarter et al. | |
| 2013/0302016 A1 | 11/2013 | Howarter et al. | |

OTHER PUBLICATIONS

U.S. Appl. No. 12/404,678; Final Rejection dated Sep. 14, 2011; 26 pages.
U.S. Appl. No. 12/404,678; Final Rejection dated Sep. 14, 2012; 38 pages.
U.S. Appl. No. 12/404,678; Issue Notification dated Jul. 3, 2013; 1 page.
U.S. Appl. No. 12/404,678; Non-Final Rejection dated Jan. 28, 2013; 30 pages.
U.S. Appl. No. 12/404,678; Non-Final Rejection dated May 13, 2011; 28 pages.
U.S. Appl. No. 12/404,678; Non-Final Rejection dated Jun. 1, 2012; 33 pages.
U.S. Appl. No. 12/404,678; Notice of Allowance dated Mar. 22, 2013; 18 pages.
U.S. Appl. No. 12/415,092; Final Rejection dated Mar. 2, 2012; 30 pages.
U.S. Appl. No. 12/415,092; Issue Notification dated Dec. 18, 2012; 1 page.
U.S. Appl. No. 12/415,092; Non-Final Rejection dated Dec. 6, 2011; 24 pages.
U.S. Appl. No. 12/415,092; Non-Final Rejection dated Jul. 9, 2012; 29 pages.
U.S. Appl. No. 12/415,092; Notice of Allowance dated Sep. 6, 2012; 16 pages.
U.S. Appl. No. 12/613,364; Final Rejection dated May 24, 2012; 16 pages.
U.S. Appl. No. 12/613,364; Issue Notification dated Apr. 3, 2013; 1 page.
U.S. Appl. No. 12/613,364; Non-Final Rejection dated Nov. 13, 2012; 28 pages.
U.S. Appl. No. 12/613,364; Non-Final Rejection dated Nov. 28, 2011; 22 pages.
U.S. Appl. No. 12/613,364; Notice of Allowance dated Jan. 8, 2013; 11 pages.
U.S. Appl. No. 13/940,999; Interview Summary dated Jan. 26, 2015; 2 pages.
U.S. Appl. No. 13/940,999; Issue Notification dated Apr. 29, 2015; 1 page.
U.S. Appl. No. 13/940,999; Notice of Allowance dated Jan. 22, 2015; 40 pages.

* cited by examiner

MEDIA CONTENT SHIFTING

CROSS REFERENCE TO RELATED APPLICATIONS

This application is a Continuation of U.S. patent application Ser. No. 13/940,999, filed Jul. 12, 2013 by Jamie Howarter et al. entitled, "Media Content Shifting", which is a Continuation of U.S. patent application Ser. No. 12/404,678 (Now U.S. Pat. No. 8,495,687), filed Mar. 16, 2009 by Jamie Howarter et al. entitled, "DVR Home Network Content Shifting", both of which is hereby incorporated by reference in its entirety.

BACKGROUND OF THE INVENTION

The disclosed invention is related to the field of digital video recorders (DVR). A digital video recorder is an electronic device used to record television programming. A digital video recorder works similar to, and is about the same size as a VCR but instead of recording to a video cassette tape, a DVR uses a hard disk drive for storing television programming data. The size/capacity of the hard disk drive determines how much television programming can be recorded. Currently, if a DVR runs of out recording space while recording a program, the recording will stop. Some DVRs may be set to automatically delete previously recorded programs from the hard disk drive of the DVR when additional space is needed.

SUMMARY

Embodiments of the disclosed invention include a system and method for recording television content. For example, in one embodiment, a method performed by a digital video recorder is disclosed that includes receiving a request from a user to record a television content, monitoring for the start time of the television content, determining an amount of storage space needed to store the television content, and determining, at a pre-specified time prior to the start time, whether there is enough free storage space on an internal data storage unit of the DVR to store the television content based on the amount of storage needed to store the television content. In response to a determination that the internal data storage unit of the DVR does not contain enough free storage space to store the television content, the method communicates with a home gateway to determine whether another device connected to the home gateway has enough free storage space to store the television content. The method routes the storage of a recording of the television content to the data storage unit associated with the device via the home gateway in response to a determination that the device connected to the home gateway has enough free storage space to store the television content.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
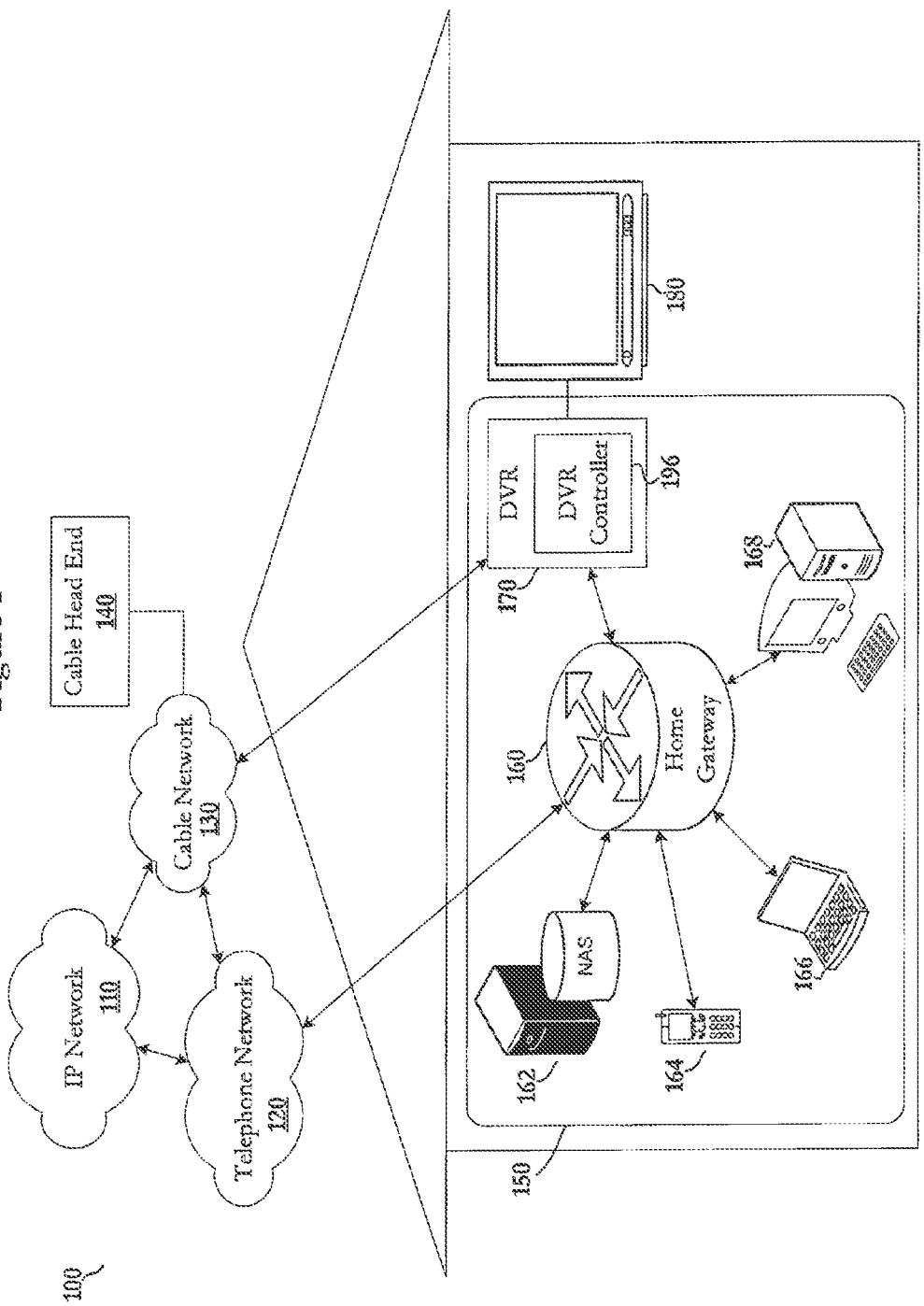
FIG. 1 depicts an embodiment a network environment in which the illustrative embodiments may be implemented.

FIG. 1 depicts an embodiment a network environment 100 in which the illustrative embodiments may be implemented. In the depicted embodiment, a plurality of devices, such as, but not limited to, one or more communication devices and/or data processing systems, may communicate over a home gateway 160. Home gateway 160 is a device that connects devices within a home network 150 to each other and to an IP Network 110. For example, in one embodiment, home network 150 may include, but is not limited to, a network area storage (NAS) device 162, a communication device 164, a laptop 166, a desktop 168, and a digital video recorder 170. In some embodiments, home gateway 160 may support Dynamic Host Configuration Protocol (DHCP). DHCP is a network application protocol used by devices (DHCP clients) to obtain configuration information for operation in an Internet Protocol network, such as, home network 150. DHCP enables devices to be added to home network 150 with little or no manual intervention. In other embodiments, a user may manually configure the IP addresses (static IP address) of the devices in home network 150.

In one embodiment, network area storage device 162 may be a self-contained computer connected to home network 150, with the sole purpose of supplying file-based data storage services to other devices on home network 150. In some embodiments, network area storage device 162 may be controlled and configured over home network 150 using a data processing system, such as, but not limited to, desktop 168 or laptop 166. In addition, network area storage device 162 may contain one or more hard disk drives. Network area storage device 162 may utilize any file-based protocols, such as, but not limited to, Network File Storage (NFS) or Server Message Block/Common Internet File System (SMB/CIFS) for establishing the underlying host-to-host connections via an Internet Protocol (IP) network.

In some embodiments, communication device 164 may be any type of communication device capable of communicating with home gateway 160. For example, in one embodiment, communication device 164 may be a mobile phone utilizing IEEE 802.11 standards (also called Wireless LAN (WLAN) and Wi-Fi) for communicating with home gateway 160. In other embodiments, communication device 164 may be a wired voice over IP (VOIP) phone connected to home gateway 160 for enabling communication device 164 to place and receive calls over IP Network 110.

IP Network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, IP Network 110 may include other types of data networks, such as, but not limited to, an intranet, a private local area network (LAN), a wide area network (WAN), and a wireless local area network (WLAN). In addition, in some embodiments, IP Network 110 may communicate with one or more different networks, such as, but not limited to, a telephone network 120 and a cable network 130 for providing services to devices in home network 150.

In one embodiment, telephone network 120 may include a public switched telephone network (PSTN). The public switched telephone network is the standard telephone network, consisting generally of copper wires for carrying analog voice data, utilized by most homes. In some embodiments, telephone network 120 may also include digital telephone networks, such as, but not limited to, an integrated services digital network (ISDN) and a fiber distributed data interface (FDDI) network. Additionally, in some embodiments, telephone network 120 may include one or more cellular networks, such as, but not limited to, a Global System for Mobile Communications (GSM) network, a Code-Division Multiple Access (CDMA) network, an Enhanced Data GSM Environment (EDGE) network, and a 3G/4G network.

In some embodiments, cable network 130 supplies television content to a plurality of subscribers. For example, in one embodiment, cable network 130 may include a cable head end 140. Cable head end 140 is a facility that originates and communicates cable/satellite TV services to a plurality of subscribers, such as, but not limited to, digital video recorder 170. In addition, in one embodiment, cable head end 140 may also receive upstream requests, such as, but not limited to, receiving a video on demand request, from digital video recorder 170. In some embodiments, cable network 130 may include, but is not limited to, one or more coaxial cable networks, fiber-optic networks, and/or satellite networks. Additionally, in some embodiments, cable network 130 may also include twisted pair networks for providing IPTV cable television-type services.

In accordance with the disclosed embodiments, digital video recorder 170 is a device connected to home network 150 via home gateway 160. In one embodiment, digital video recorder 170 may include a digital video recorder control module 196 for enabling recording of television content received from cable head end 140. Additionally, in some embodiments, digital video recorder 170 may be coupled to a television 180 for displaying the television content. As will be further described, in one embodiment, digital video recorder 170 may include software, hardware, and/or a combination of both for enabling digital video recorder 170 to record and store television content on one or more devices in home network 150 via home gateway 160. For example, in accordance with one embodiment, digital video recorder 170 may automatically record and store a television program on network area storage device 162 in the event digital video recorder 170 determines that digital video recorder 170 does not contain enough free storage space on an internal hard drive associated with digital video recorder 170 to completely store the television program.

Figure 2:
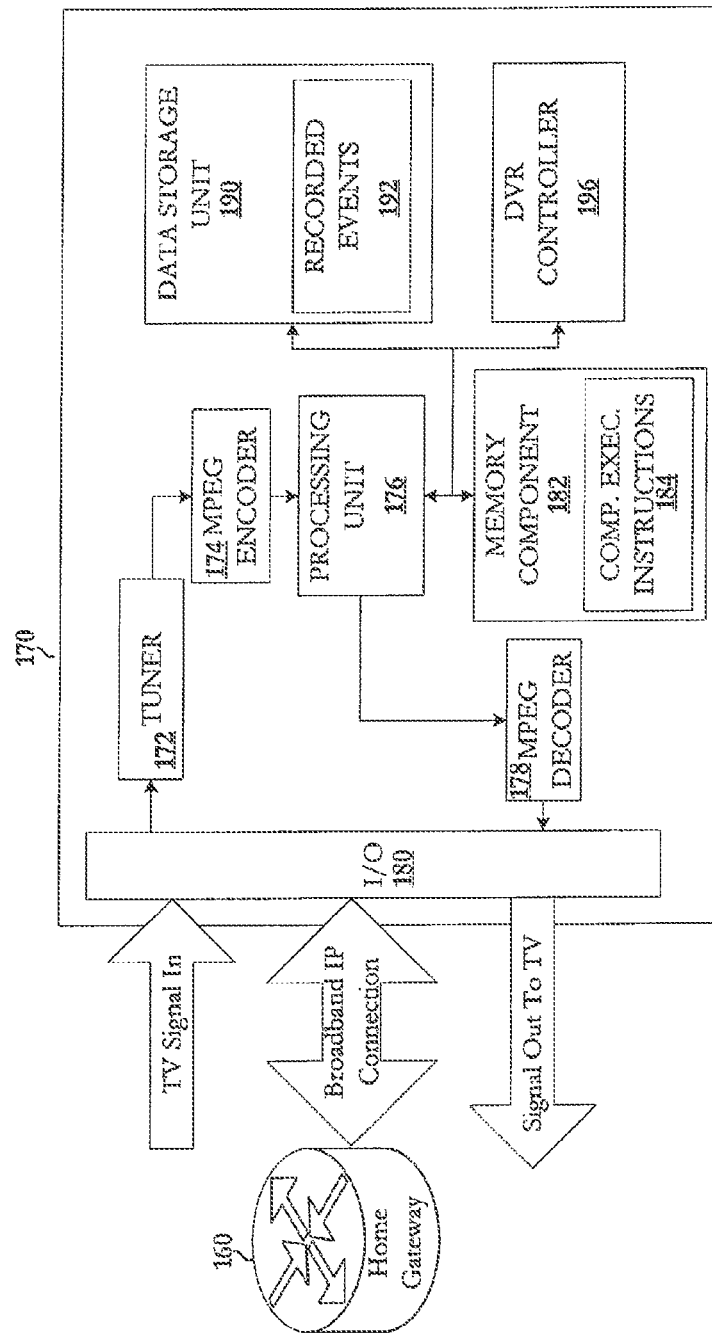
FIG. 2 depicts an embodiment of a digital video recorder for recording television content in accordance with the illustrative embodiments.

With reference now to FIG. 2, an embodiment of digital video recorder 170 for recording television content is presented. The depicted embodiment is intended to illustrate some aspects of a digital video recorder in accordance with the disclosed embodiments and is not intended to imply any architectural or design limitations. For instance, in some embodiments, digital video recorder 170 may include other components not illustrated or discussed in the depicted embodiment for enabling recording of television content.

In the depicted embodiment, digital video recorder 170 includes a set of input/output components 180 for connecting digital video recorder 170 to one or more networks and/or devices. For example, in one embodiment, the set of input/output components 180 may include coaxial connectors for receiving a plurality of television content signals and for outputting television content to television 180. In addition, in accordance with some embodiments, the set of input/output components 180 includes a broadband IP network connector, such as, but not limited to, an Ethernet port, for connecting digital video recorder 170 to home gateway 160 and the rest of the devices of home network 150 via home gateway 160. Alternatively, or in addition to, in some embodiments, the set of input/output components 180 may include a wireless transceiver. In one embodiment, the wireless transceiver may support Wireless Application Protocol (WAP) for communicating data wirelessly with one or more devices, such as, but not limited to, home gateway 160.

In addition, in some embodiments, the set of input/output components 180 may pass the inbound television signals to one or more tuner 172, such as, but not limited to, an ATSC (Advanced Television Systems Committee) tuner. An ATSC tuner is a device that is used in the reception of digital television signals (DTV), including, but not limited to, high definition television (HDTV) signals, standard definition television (SDTV) signals, data broadcasting, multi-channel surround-sound audio, and satellite direct-to-home broadcasting. In one embodiment, tuner 172 may decompress and demodulate the inbound television signals. Additionally, in some embodiments, tuner 172 may convert analog television signals broadcasted over the air to a digital signal that can be manipulated, such as, but not limited to, media reformatting, for viewing on a particular television set. For instance, a standard television has an interlaced picture; where as a digital television has a progressive scan picture. In other embodiments, tuner 172 may provide audio/video synchronization for properly coordinating the audio signal with the video signal.

In some embodiments, tuner 172 may pass the television signal to a motion picture experts group (MPEG) encoder 174, e.g., if the television signal is broadcast in analog form, for encoding the television signal into MPEG format. MPEG encoder 174 may support one or more standards, such as, but not limited to, MPEG-2. MPEG-2 is a standard for the generic coding of moving pictures and associated audio information. MPEG-2 is widely used for digital television signals that are broadcast by over-the-air, by cable, and by direct broadcast satellite TV systems. In addition, digital video recorder 170 may include one or more MPEG decoder 178. MPEG decoder 178 decodes an MPEG formatted signal for generating a viewable signal and outputs the signal to a television set.

Digital video recorder 170 may include one or more processing unit 176. Processing unit 176 may comprise of one or more microprocessors for executing computer usable program code/instructions for providing television programming and for recording television content. For example, in one embodiment, processing unit 176 may execute computer executable instructions 184 stored in memory component 182 for communicating with home gateway 160 for storing a recording of a television program on a network storage device in the event that digital video recorder 170 does not contain enough internal free storage space for storing the recording of the television program.

For instance, digital video recorder 170 may include one or more internal data storage unit 190. Data storage unit 190 is a non-volatile memory component of digital video recorder 170, such as, but not limited to, a hard disk drive. Non-volatile memory retains stored data when power is lost. In some embodiments, data storage unit 190 may be a removable hard drive and/or may be replaceable with a larger hard drive. Data storage unit 190 may store a plurality of recorded events 192. As referenced herein a recorded event, is a television program/content that a user selects digital video recorder 170 to record.

For instance, in some embodiments, digital video recorder 170 includes a DVR controller 196 for enabling a user to select a program from an electronic programming guide the user desires to be recorded. For example, in some embodiments, DVR controller 196 may enable a user to record a single program, all instances of the program, or all new instances of the program. In accordance with the disclosed embodiments, DVR controller 196 may determine, at a pre-specified time prior to a start time of the selected television program, whether there is enough free storage space on data storage unit 190 to store the television program based on the amount of storage space needed to store the television program/content. In some embodiments, the pre-specified time prior to the start time of the selected television program for determining whether there is enough free storage space on data storage unit 190 to store the television program may occur at the time the user selects the desired television program to be recorded. Alternatively, or in addition to, in some embodiments, the pre-specified time for determining whether there is enough free storage space on data storage unit 190 to store the television program may occur at a specified time (for example, a minute before the start time of the television program) immediately prior to the start time of the selected television program.

In accordance with one embodiment, in response to DVR controller 196 determining that data storage unit 190 unit does not contain enough free storage space to store the television content, DVR controller 196 communicates with home gateway 160 to determine whether a device connected to home gateway 160, e.g., network area storage device 162, laptop 166, and/or desktop 168, as enough free storage space on a data storage unit associated with the device to store the television content. In response to determining a device connected to home gateway 160 has enough free storage space to store the television content, DVR controller 196 routes the storage of a recording of the television content to the data storage unit associated with the home network 150 device via home gateway 160. For instance, in one embodiment, DVR controller 196 sends the data packets comprising the television content to an IP address of a home network 150 device via home gateway 160.

Additionally, in accordance with the disclosed embodiments, DVR controller 196 may retrieve the television content stored on a home network 150 device in response to receiving a user request to playback a recorded television program. For example, in some embodiments, DVR controller 196 may store a data table comprising a list of recorded television programs and the corresponding IP addresses of the network device on which the recorded television program is stored. In one embodiment, if enough free storage space is available, DVR controller 196 may download the recorded television program from a home network 150 device to data storage unit 190 for playing back the recorded television program. In other embodiments, DVR controller 196 may stream the recorded television program from a home network 150 device to digital video recorder 170 for playing back the recorded television program on a television set.

In addition, in some embodiments, the stored television content may include a digital rights management (DRM) encoding that restricts access/playback of the stored television content to only digital video recorder 170. In other embodiments, the digital rights management encoding may enable any device associated with home network 150, such as, but not limited to, communication device 164, laptop 166, and/or desktop 168, to playback the stored television content. For example, in one embodiment, a user must register a media access control (MAC) address associated with each device within home network 150 with home gateway 160 and/or digital video recorder 170 for enabling the device to playback the stored content.

Figure 3:
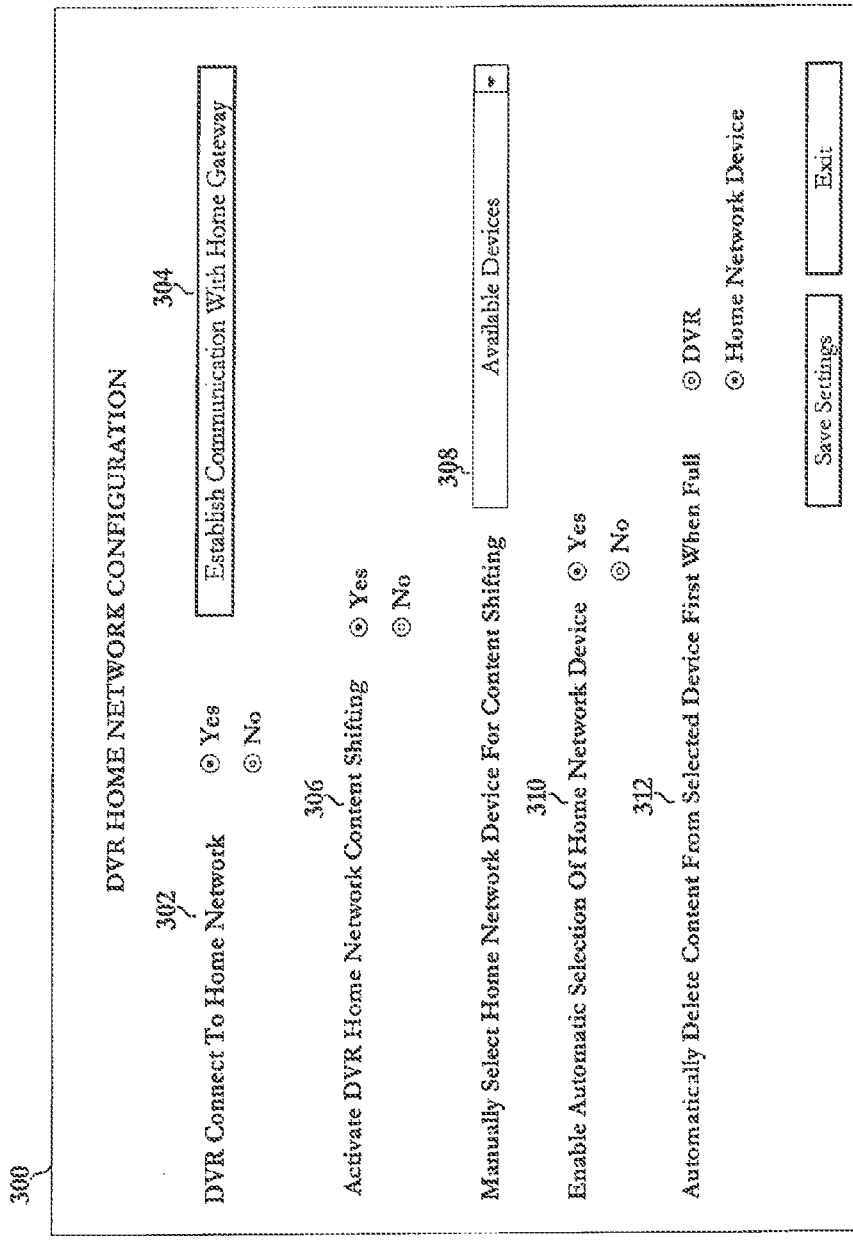
FIG. 3 depicts an embodiment of a user interface associated with a digital video recorder for recording television content in accordance with the illustrative embodiments.

FIG. 3 depicts an embodiment of a user interface 300 that may be associated with digital video recorder 170 for enabling recording of television content on a home network device in accordance with the illustrative embodiments. In the depicted embodiment, user interface 300 includes a user selectable option for connecting digital video recorder 170 to a home network, such as, but not limited to, home network 150. In one embodiment, user interface 300 may include a user selectable button 304 for dynamically establishing a connection with home gateway 160. For instance, in one embodiment, home gateway 160 may support Dynamic Host Configuration Protocol for enabling digital video recorder 170 to dynamically establish the IP addressing configuration between home gateway 160 and digital video recorder 170.

In addition, in some embodiments, user interface 300 may include a user selectable option 306 for activating a DVR home network content shifting feature for enabling digital video recorder 170 to shift storage of a recording of a television program onto a home network device in the event that data storage unit 190 does not contain enough free storage space to store the recording of the television program. In addition, in some embodiments, the DVR home network content shifting feature may include enabling a home network device, such as, but not limited to, communication device 164, laptop 166, and/or desktop 168, to retrieve a stored television program content from digital video recorder 170. Alternatively, or in addition to, in some embodiments, a home network device, such as, but not limited to, communication device 164, laptop 166, and/or desktop 168, may retrieve a stored television program one another or from network area storage device 162 for playback on the particular home network device.

Additionally, in some embodiments, user interface 300 may include a user selectable option 308 for enabling a user to manually select a particular home network device in which digital video recorder 170 would automatically record a television program onto in the event that an internal data storage unit associated with digital video recorder 170 is unable to store the television program, e.g., when data storage unit 190 does not contain enough free storage space, or when data storage unit 190 malfunctions or becomes corrupted. Alternatively, or in addition to, in some embodiments user interface 300 may include a user selectable automatic selection option 310 for enabling digital video recorder 170 to dynamically select a home network device capable of storing the recording of a television program. In addition, in some embodiments, user interface 300 may include a user selectable option 312 for a enabling a user to specify which device, e.g., digital video recorder 170 or one of the home network devices, to delete content from, in the event additional storage space is needed to record a television program.

Figure 4:
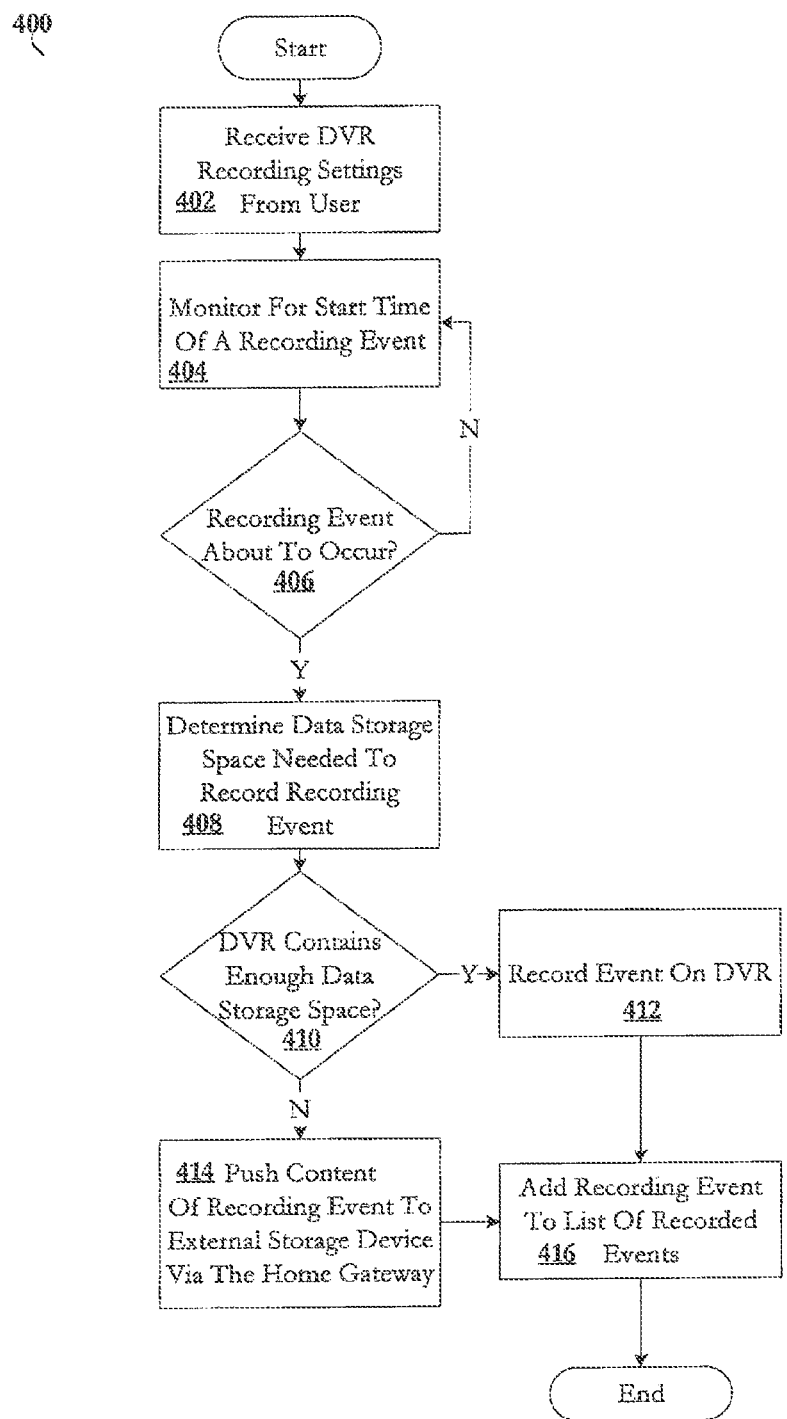
FIG. 4 depicts a flowchart illustrating an embodiment of a process for recording television content in accordance with the illustrative embodiments.

With reference now to FIG. 4, a flowchart illustrating an embodiment of a process 400 for recording television content, such as, but not limited to, a television program, is presented in accordance with the illustrative embodiments. Process 400 may be executed by a digital video recorder, such as, but not limited to, digital video recorder 170 depicted in FIG. 2. Process 400 begins, at step 402, by receiving a DVR recording request from a user to record a desired television program. In this embodiment, process 400, at step 404, monitors for the start time of the desired television program. At step 406, the process determines whether the recording event is about to begin, e.g., the start time of the recording event is about to occur in 2 minutes. In one embodiment, in response to a determination that the recording event is about to occur, the process determines the amount of data storage space needed to store a recording of the recording event at step 408. At step 410, the process determines whether digital video recorder 170 has enough free storage space on an internal data storage unit to store in the recording of the television program. In response to a determination that the internal data storage unit associated with digital video recorder 170 contains enough free storage space to store the recording of the television program, the process, at step 412, records and stores the recording of the television program on the internal data storage unit of digital video recorder 170. However, if process 400 determines the digital video recorder 170 does not contain enough internal free storage space, the process, at step 414, pushes/routes, via a home gateway device, the data associated with the recording of the television program to an external home network device having enough free storage space to store the recording of the television program. At step 416, the process adds the recording event to a list of recorded events associated with digital video recorder 170, with process 400 terminating thereafter.

In some embodiments, if the process determines that neither the internal data storage unit associated with the digital video recorder nor any home network device associated with the digital video recorder contains enough free storage space to store a recording of the selected program, the process may notify the user that there is insufficient storage space to record the selected program. For example, in one embodiment, the process may present a pop-up message to the user, on a television connected to the digital video recorder, notifying the user that there is insufficient storage space to record the selected program. Alternatively, or in addition to, in some embodiments, the process may send the user a SMS text message or an email message via home gateway 160 to inform a user that no device connected to the home gateway has sufficient storage space to store the selected program.

Additionally, in some embodiments, process 400 may further include a method for switching a selected recorded program from recording a higher grade signal (e.g., an HD signal) to recording a lower grade signal (e.g., standard definition) in response to a determination that there is not enough free storage space to record the higher grade signal, but that there is enough free storage space to record the lower grade signal. For instance, in some embodiments, a service provider may provide a particular channel in both standard definition and high definition. In these embodiments, if the process determines that neither the internal data storage unit(s) associated with the digital video recorder nor any home network device associated with the digital video recorder contains enough free storage space to store a recording of the selected program at the high definition, the process may determine whether the selected program is available at a lower grade signal and, if available, whether there is enough free storage space on either the digital video recorder or on a home network device to store a recording of the selected program at the lower grade signal. In one embodiment, in response to determining that there is adequate space to store the selected program at the lower grade signal, the process automatically switches over to recording the selected program at the lower grade signal and storing the recording on the available device.

Figure 5:
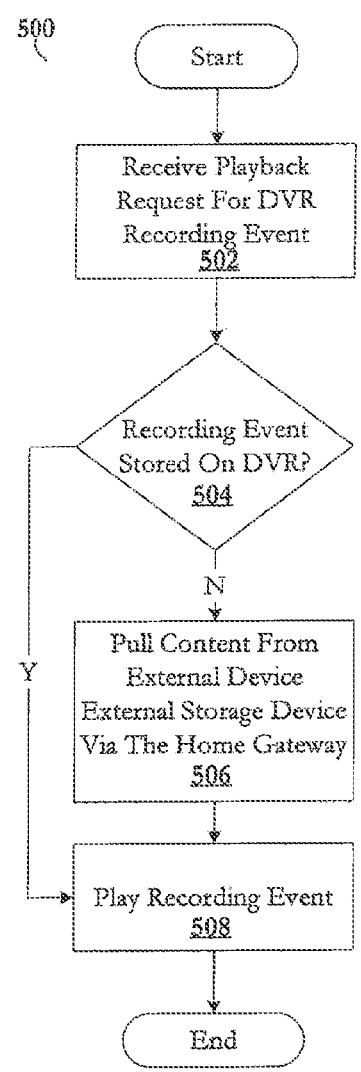
FIG. 5 depicts a flowchart illustrating an embodiment of a process for playing back television content in accordance with the illustrative embodiments.

FIG. 5 depicts a flowchart illustrating an embodiment of a process for playing back recorded television content in accordance with the illustrative embodiments. Process 500 may be executed by a digital video recorder, such as, but not limited to, digital video recorder 170 depicted in FIG. 2. Process 500 begins, at step 502, by receiving a DVR playback request from a user to play back a recorded television program. At step 504, the process determines the storage location of the requested television program. For example, in one embodiment, the process may query a data table comprising a list of recorded events and their corresponding IP addresses associated with a device on which the recorded event is stored to determine the storage location of the requested television program. If at step 504, the process determines that the requested television program is stored on an internal data storage unit of the digital video recorder, the process retrieves the stored program data from the internal data storage unit and plays back the recording event at step 508, with process 500 terminating thereafter.

However, if the process determines that the requested television program is stored on a home network device, the process, at step 506, retrieves/pulls the television content from the identified home network device via a home gateway device. At step 508, plays back the recording event, with process 500 terminating thereafter.

Accordingly, the disclosed embodiments include a system and method for recording television content over a home network. For example, in one embodiment, a method performed by a digital video recorder is disclosed that includes receiving a request from a user to record a television content, monitoring for the start time of the television content, determining an amount of storage space needed to store the television content, and determining, at a pre-specified time prior to the start time, whether there is enough free storage space on the internal data storage unit to store the television content based on the amount of storage needed to store the television content. In response to a determination that the internal data storage unit does not contain enough free storage space to store the television content, the method communicates with a home gateway to determine whether a device connected to the home gateway has enough free storage space on a data storage unit associated with the device to store the television content. The method routes the storage of a recording of the television content to the data storage unit associated with the device via the home gateway in response to a determination that the device connected to the home gateway has enough free storage space on the data storage unit associated with the device to store the television content.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method of recording a television content, the method comprising:
    determining, with a digital video recorder connected with a home network, an amount of storage space needed to store the television content;
    determining, at a pre-specified time prior to a start time of the television content, whether there is sufficient free storage space on the digital video recorder to store the television content;
    responsive to a determination that the digital video recorder does not contain sufficient free storage space to store the television content, determining whether a separate device connected to the home network has enough free storage space to store the television content;
    responsive to a determination that the separate device connected to the home network has sufficient free storage space on a data storage unit to store the television content, routing, from the digital video recorder to the separate device, the television content via a home gateway;
    storing, in the digital video recorder, a table of recorded television programs and associated identifiers of devices on which the recorded television programs are stored, wherein the identifiers are Internet Protocol (IP) addresses;
    receiving a request to play the television content stored on the separate device on a display device in communication with the digital video recorder;

responsive to receiving the request to play the television content stored on the separate device, accessing, with the digital video recorder, the television content from the separate device via the home gateway and determining, with the digital video recorder, whether the digital video recorder has available storage space to store the television content;

based on a determination that the digital video recorder has available storage space to store the requested television content, downloading the requested television content from the separate device onto the digital video recorder to play the requested television content on the display device in communication with the digital video recorder; and based on a determination that the digital video recorder does not have available storage space to store the requested television content, streaming the requested television content from the separate device to the digital video recorder to play the requested television content on the display device in communication with the digital video recorder.

2. The method of claim 1, wherein determining whether the separate device has sufficient storage space comprises communicating with the home gateway on the home network.

3. The method of claim 2, wherein the home gateway connects the digital video recorder with the home network.

4. The method of claim 2, wherein the home gateway communicates with a plurality of devices capable of storing the television content.

5. The method of claim 1, wherein the separate device is pre-selected by a user.

6. The method of claim 1, wherein the digital video recorder dynamically selects a device.

7. The method of claim 1, wherein the separate device is a wireless phone.

8. The method of claim 1, wherein the separate device is a network attached storage device.

9. The method of claim 1, wherein the separate device is a laptop or desktop computer.

10. The method of claim 1, further comprising playing back the retrieved television content.

11. The method of claim 1, wherein the television content is protected with digital rights management (DRM).

12. The method of claim 11, further comprising:
receiving a registration of a device identifier of the separate device; and
enabling playback of the television content on the separate device based on the device identifier.

13. A digital video recorder for recording a television content, the digital video recorder comprising:
a set of input/output interfaces for receiving the television content and for communicatively connecting the digital video recorder with a home network;
an internal data storage unit for storing a plurality of television content;
a digital video recorder controller module configured to:
determine amount of storage space needed to store the television content;
determine, at a pre-specified time prior to a start time of the television content, whether there is sufficient free storage space on the digital video recorder to store the television content;

responsive to a determination that the digital video recorder does not contain sufficient free storage space to store the television content, determine whether a separate device connected to the home network has enough free storage space to store the television content;

responsive to a determination that the separate device connected to the home network has sufficient free storage space on a data storage unit to store the television content, route, from the digital video recorder to the separate device and via a home gateway, the television content;

store, in the digital video recorder, a table of recorded television programs and associated identifiers of devices on which the recorded television programs are stored, wherein the identifiers are Internet Protocol (IP) addresses;

receive a request to play the television content stored on the separate device on a display device in communication with the digital video recorder;

responsive to receiving the request to play the television content stored on the separate device, access the television content from the separate device via the home gateway and determine whether the digital video recorder has available storage space to store the requested television content;

based on a determination that the digital video recorder has available storage space to store the requested television content, download the requested television content from the separate device onto the digital video recorder to play the requested television content on the display device in communication with the digital video recorder; and based on a determination that the digital video recorder does not have available storage space to store the requested television content, stream the requested television content from the separate device to the digital video recorder to play the requested television content on the display device in communication with the digital video recorder.

14. The digital video recorder of claim 13, wherein the digital video recorder is connected with the home network via the home gateway.

15. The digital video recorder of claim 14, wherein the digital video recorder controller module is further configured to:
present a user interface for enabling a user to configure the digital video recorder to communicate with the home gateway.

16. The digital video recorder of claim 13, wherein the digital video recorder controller module is further configured to:
present a user interface for enabling a user to configure the digital video recorder to select the separate device.

17. The digital video recorder of claim 14, wherein the digital video recorder controller module is further configured to notify the user of insufficient recording space via an SMS text message in response to a determination that no device connected to the home gateway has sufficient free storage space to store the television content.

* * * * *